May 6, 1930.                C. B. BROWN                1,757,897
                              HARVESTER
                        Filed Jan. 24, 1927        3 Sheets-Sheet 1
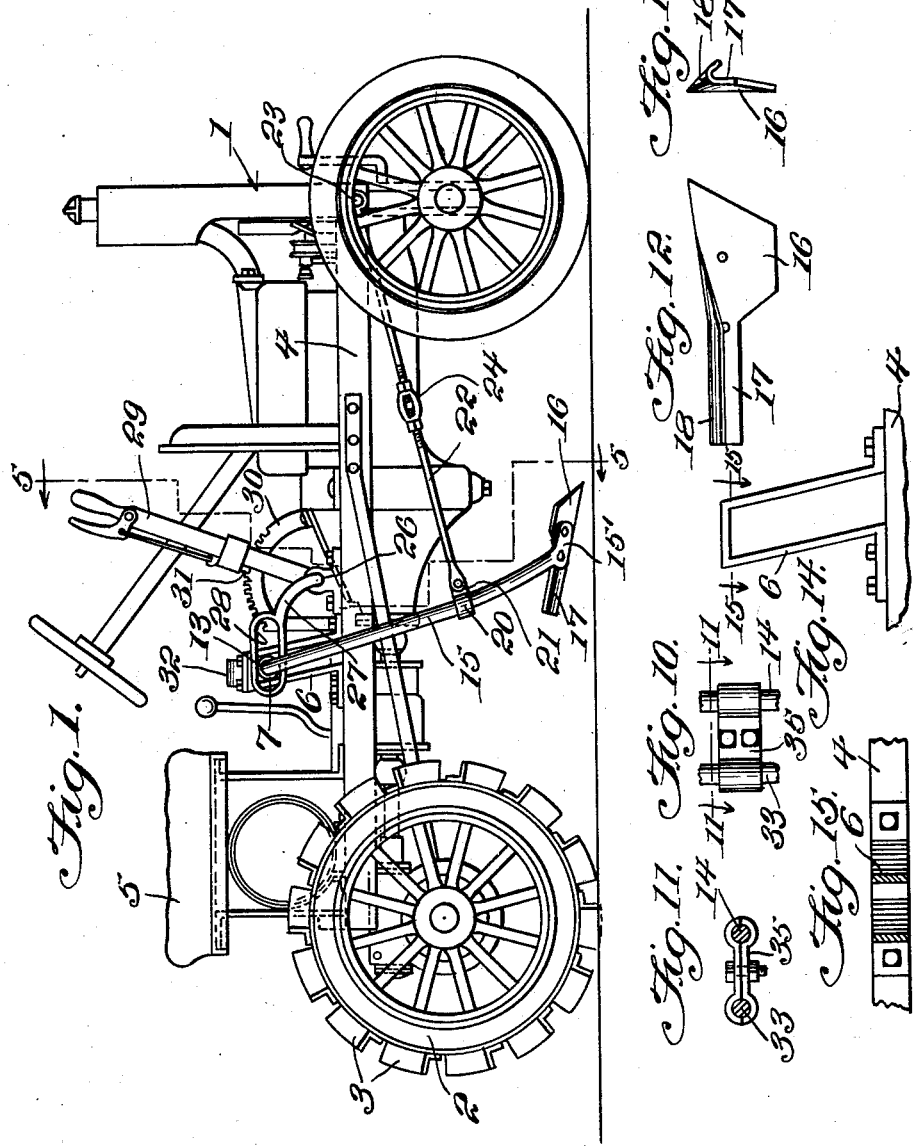
Chester B. Brown
INVENTOR
BY Victor J. Evans
ATTORNEY
WITNESS: J.T.L. Wright May 6, 1930.  C. B. BROWN  1,757,897
HARVESTER
Filed Jan. 24, 1927  3 Sheets-Sheet 2
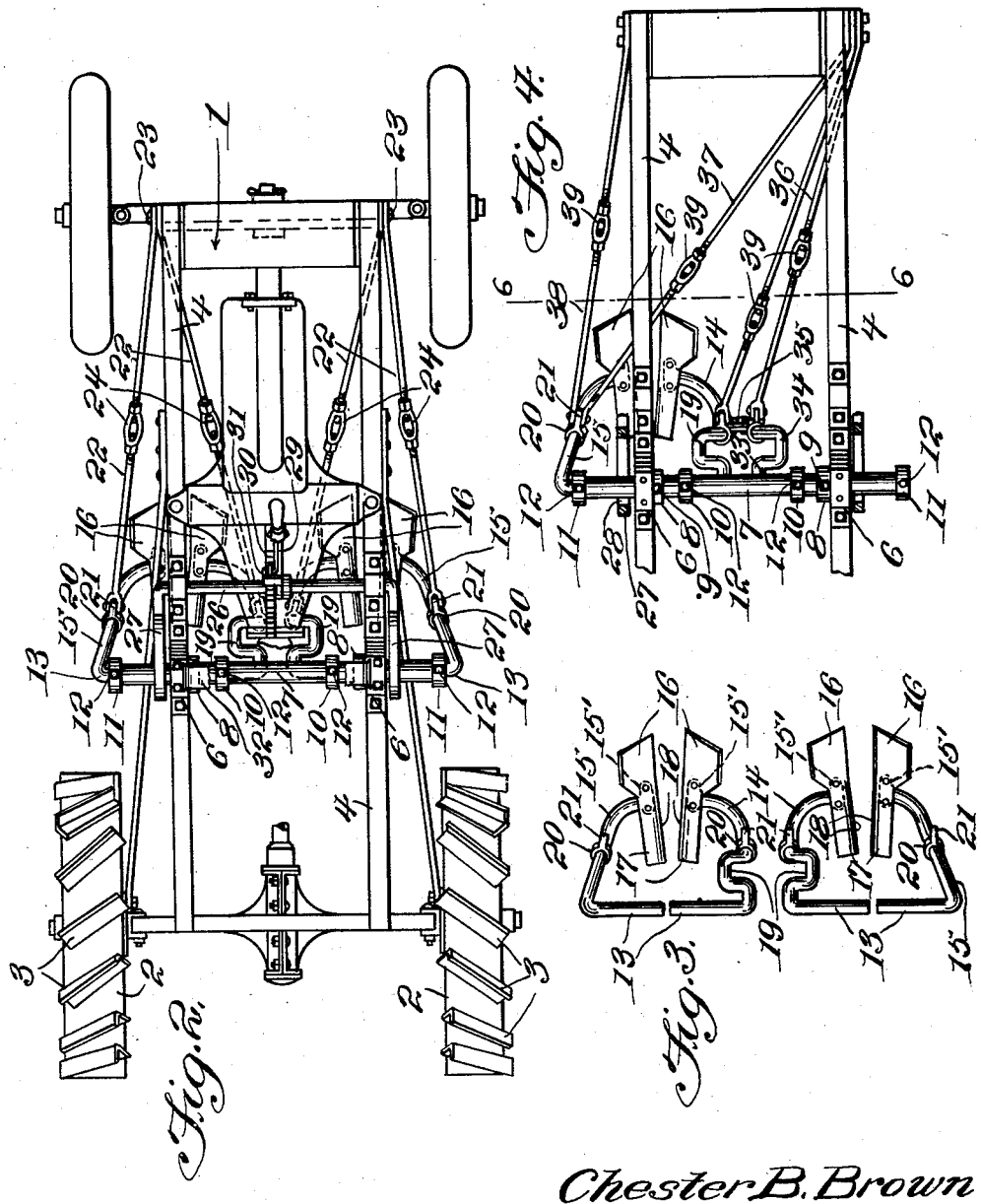
Chester B. Brown
INVENTOR
BY Victor J. Evans
ATTORNEY
WITNESS: J. T. L. Wright May 6, 1930. C. B. BROWN 1,757,897
HARVESTER
Filed Jan. 24, 1927 3 Sheets-Sheet 3
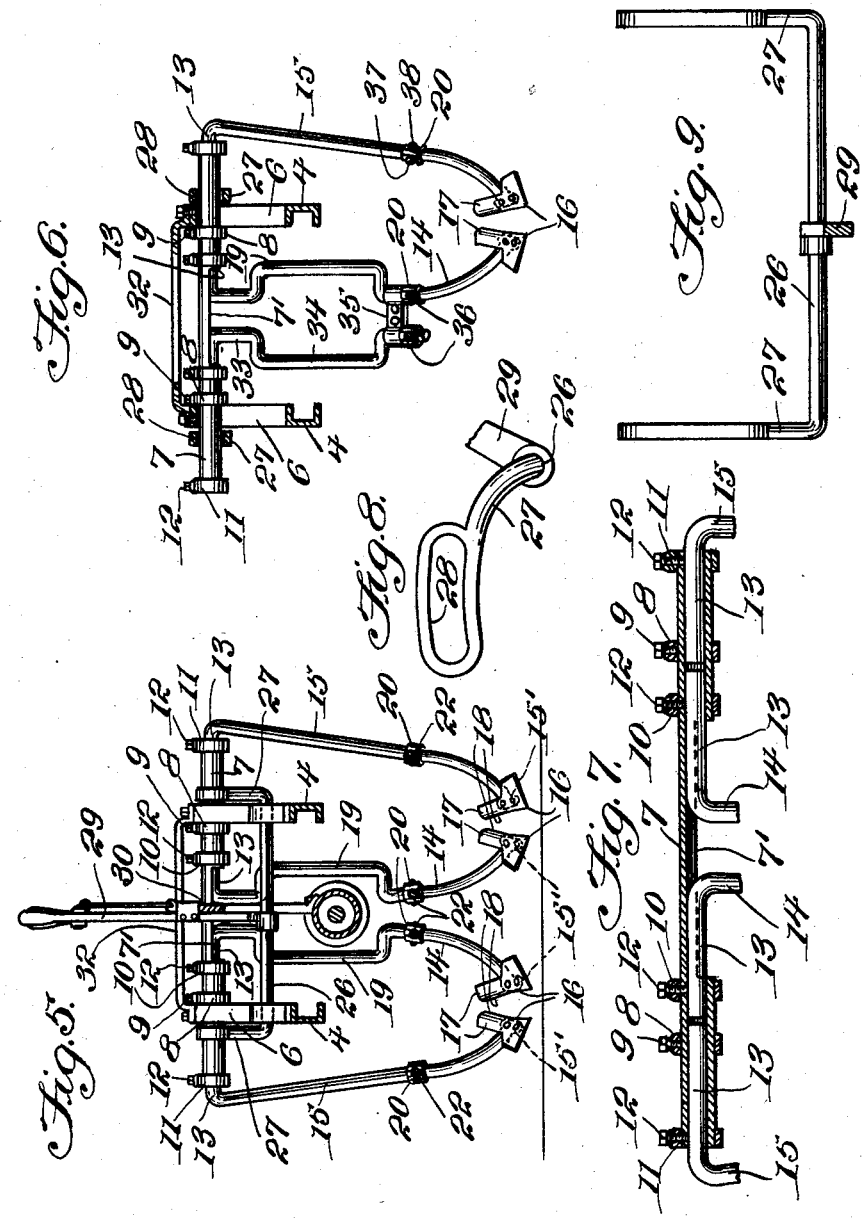
Chester B. Brown
INVENTOR
BY Victor J. Evans
ATTORNEY
WITNESS: J. T. L. Wright Patented May 6, 1930

1,757,897

UNITED STATES PATENT OFFICE

CHESTER B. BROWN, OF MORRILL, NEBRASKA

HARVESTER

Application filed January 24, 1927. Serial No. 163,195.

My present invention has reference to a motor driven harvester designed to harvest sugar beets, onions or turnips or other similar crops which are planted in rows and which must be lifted from the earth before they are gathered.

An object is the provision in a harvester of this type, of lifting blades arranged in cooperating pairs and a novel manner of suspending the same from the frame, whereby the blades may be adjusted longitudinally with respect to the frame, may be adjusted laterally on the frame and laterally with respect to each other, and wherein the said blades may be vertically adjusted to regulate the depth of the entrance thereof beneath the surface of the soil and likewise to elevate the blades above such surface.

A still further object is the provision of a device for this purpose which may be readily attached to any motor driven frame and which may be arranged to harvest either one or two rows of beets or like vegetables in an easier and more expeditious manner than can be accomplished by horse drawn harvesters.

A still further object is the provision in a harvesting machine for this purpose of blades of a particular and peculiar formation which are arranged in pairs to effectively grip the beets or like vegetable therebetween which will raise the vegetable out of the ground without injury to such vegetable.

To the attainment of the above broadly stated objects and others which will present themselves as the nature of the invention is better understood, the improvement also resides in certain other novel features of construction, combination and operative association of parts, a satisfactory embodiment of which is disclosed by the accompanying drawings.

In the drawings:

Figure 1 is a side elevation of the improvement.

Figure 2 is a top plan view thereof.

Figure 3 is a top plan view of the harvesting blades and the supporting arms therefor.

Figure 4 is a fragmentary plan view to illustrate the arrangement of parts when only a single row of beets or like vegetables are to be harvested.

Figure 5 is a sectional view approximately on the line 5—5 of Figure 1.

Figure 6 is a sectional view approximately on the line 6—6 of Figure 4.

Figure 7 is a central longitudinal sectional view through the tubular support for the upper ends of the blade carrying arms.

Figure 8 is a side elevation of the means for vertically adjusting the blade carrying arms.

Figure 9 is an end view of the device illustrated in Figure 8.

Figure 10 is a plan view of the spacer clamp.

Figure 11 is a sectional view on the line 11—11 of Figure 10.

Figure 12 is a plan view of one of the lifting blades.

Figure 13 is an end view thereof.

Figure 14 is a side elevation of one of the guides.

Figure 15 is a sectional view on the line 15—15 of Figure 14.

My improvement may be arranged upon any type of motor driven vehicle. In the showing of the drawings, the motor driven vehicle 1 has its traction wheels 2 provided with peripheral calks 3, and the frame of the machine, indicated by the numeral 4, supports thereon, adjacent to the traction wheels 2 a seat 5 for the driver.

On the side members of the frame 4, forward of the seat 5, I secure vertically directed angularly disposed guides 6. Each guide is preferably constructed from a single piece of metal bent to provide a rectangular frame which, as stated, is arranged at an angle and the arms thereof are offset to provide feet which are bolted to the members of the frame. Received through the guides 6 there is a tubular member 7. The member 7, from the center thereof, is notched on its under face, as at 7'. Arranged on the tube there is a pair of collars 8 through which pass binding elements 9 that clamp the collars to the tube. These collars are in the nature of stop elements that contact with the inner faces of the guides 6 and consequently hold the tube 7 from longitudinal movement through the guides. On the tubular member 7 there are other collars arranged in pairs, the inner collars being indicated by the numerals 10 and the outer collars by the numeral 11. There are threaded through these collars 10 and 11 bolt members 12 which pass through openings in the tube 7 and which contact with and frictionally bind in the bore of the sleeve the upper and angle ends 13 of the inner and outer blade supporting arms 14 and 15, respectively. The angle ends of the inner arms 14 are first received through the notch 7' and are thus inserted in the tube. By fixing the angle ends 13 of the cooperating pairs of arms 14 and 15 in a manner as above described, it will be noted that the said pairs of arms may be adjusted laterally with respect to each other, and likewise by providing the tube 7 with the adjustable stop collars 9 the tube, and the arms thereon may be adjusted laterally with respect to the frame of the machine.

The cooperating pairs of blade supporting arms are preferably in the nature of rods which are round in cross section and these rods, adjacent to their lower ends are bent outwardly and from thence extended inwardly toward each other, the ends of the said rods being preferably widened and flattened, as at 15'. To the ends 15' of the rods there are attached the lifting blades 16. By reference to Figures 12 and 13 of the drawings it will be noted that the outer portions of the blades 16 are widened, the edges thereof sharpened and arranged at an angle, and that the active edge of the blades on the reduced rear extension portions 17 thereof are rounded upon themselves, as at 18. The blades on the respective pairs of arms are arranged at the same respective angle and the rounded or curved edges 18 of the cooperating blades are designed for contacting engagement with the sides of the beets, or other vegetables, to cause the same to travel upwardly out of the ground and depositing them to the rear of the blades without inflicting injury to the vegetable.

In order that the housing for the drive shaft for the motor of the frame may freely pass between the inner arms 14, these arms are bent or arched upon themselves in the direction of the outer arms 15, as indicated by the numerals 19. The arching of these arms not only provides a passage therebetween for the drive shaft housing of the engine but materially strengthens the said arms, as the same are bent at angles opposite that upon which the strain is delivered onto the arms.

On the cooperating pairs of arms 14 and 15 there are fixed collars 20 having lugs 21, and to these lugs there are bolted the bifurcated ends of rods 22. The outer ends of the rods connected to the respective pairs of cooperating arms are removably secured, as at 23, to the sides at the front of the frame 4. The rods 22 are constructed of sections, the confronting ends of the said sections being threaded at opposite hand pitches and being engaged by turn-buckles 24. By this arrangement it will be noted that the shovel carrying arms may be adjusted longitudinally with respect to the frame 4 and the arms will be effectively braced when the rods are so adjusted.

Journaled in bearings 25 on the top of the side members of the frame 4, outward with respect to the tube 7 there is a shaft 26. This shaft has its ends provided with upwardly directed rearwardly curved arms 27, the said arms having their outer ends widened and provided with arcuate slots or openings 28 therethrough. The tubular member 7 is designed to be received through the slots 28 and to be contacted by the walls provided by the said arcuate slots. The shaft 26 has centrally fixed thereon an angle lever 29.

Suitably supported on the frame 4, at one side of the angle lever 29, there is an arched rack 30, and the lever 29 carries a handle operated spring influenced dog 31 to engage in the teeth of the rack. By operating the lever the shaft 26 will be turned to cause the hollow cam members or the curved ends of the said lever to influence the tube in a vertical direction, and as the blade carrying arms are directly connected to the tubes, the blades will be likewise vertically adjusted. The dog 31 retains the sleeve and the elements connected therewith at such vertical adjustment.

To strengthen the guides 6 the same have attached to the top portions thereof a brace bar or plate 32.

In instances where it is desired to harvest a single row of beets or like vegetables, one pair of arms 14 and 15 is dispensed with, but in order to effectively brace the remaining inner arm 14 I arrange in the tube, at the part thereof from which the first mentioned arm 14 is removed, the angle end of an arm or rod 33. The arm or rod is secured in the tube by the binding means. The rod 33 is arched outwardly, as at 34, and its outer straight end has secured thereon the eye of one end of a sectional clamp 35, the second eye end of the clamp engaging the arm 34 below the arched portion thereof. To effectively brace the shovel carrying arms 14 and 15 in this construction as well as to brace the rod or arm 33, the arm 14 and the rod 33 have pivotally secured thereto draw rods 36 which are directed angularly and removably secured to the side at the outer end of the frame 4. A similar rod 37, connected to the said end of the frame is pivotally secured on the arm 15, while a second rod 38 is pivoted opposite the rod 37 but is directed and secured to the second end of the frame. The rods 36, 37 and 38 are constructed of sections that have their confronting ends threaded at opposite hand pitches and these ends are engaged by turn-buckles 39.

While it is believed that from the foregoing description the nature and advantages of the invention will be readily apparent as well as the operation thereof, I desire to have it understood that I do not wish to limit myself to what is herein shown and described and that such changes may be resorted to when desired as fall within the scope of what I claim.

Having described the invention, I claim:—

1. In a harvesting machine for beets or like vegetables planted in rows, a wheeled frame, upwardly extending guides on the frame, a centrally notched tubular member received through the guides, stop means holding the tubular member from longitudinal movement, angularly disposed lifting blades arranged in cooperating pairs, supporting arms for the blades having upper angle ends received respectively through the ends and inserted in the notched portions of the tubular member and thereafter passed into the bore of said tubular member, adjustable means binding the angle ends of the arms in the tubular member, adjustable brace rods between the arms and the front of the frame, and means for vertically adjusting the tubular member in the guides and for sustaining said tubular member so adjusted.

2. In a harvesting machine for beets or like vegetables planted in rows, a motor driven frame, upwardly directed rearwardly inclined guides on the frame, a tubular member received through the guides and said tubular member having its under face centrally notched, adjustable stop collars on the tubular member contacting the guides, lifting blades arranged in cooperating pairs, a supporting arm for each blade, each of said arms having an upper angle end and said angle ends being inserted respectively in the ends of the tubular member and arranged in the notch of the said tubular member and moved into the bore thereof, means for adjustably binding the ends of the arms in the tubular member, adjustable brace means between the arms and the frame, a shaft journaled transversely on the frame and having upwardly curved angle ends whose outer portions are widened and provided with arcuate slots through which the tubular member passes, a lever fixed on the shaft, a spring influenced dog carried by the lever and an arched rack on the frame engaged by the dog.

In testimony whereof I affix my signature.

CHESTER B. BROWN.